US010537913B2

(12) United States Patent
Birecki et al.

(10) Patent No.: US 10,537,913 B2
(45) Date of Patent: Jan. 21, 2020

(54) SELECTIVE SLOT COATING

(71) Applicant: Hewlett-Packard Development Company, L.P., Spring, TX (US)

(72) Inventors: Henryk Birecki, Palo Alto, CA (US); Napoleon I Leoni, Palo Alto, CA (US); Omer Gila, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 31 days.

(21) Appl. No.: 14/787,598

(22) PCT Filed: Apr. 29, 2013

(86) PCT No.: PCT/US2013/038652
§ 371 (c)(1),
(2) Date: Oct. 28, 2015

(87) PCT Pub. No.: WO2014/178818
PCT Pub. Date: Nov. 6, 2014

(65) Prior Publication Data
US 2016/0354800 A1 Dec. 8, 2016

(51) Int. Cl.
*B05C 5/02* (2006.01)
*B05C 11/10* (2006.01)
(Continued)

(52) U.S. Cl.
CPC ............ *B05C 5/0279* (2013.01); *B05C 5/025* (2013.01); *B05C 5/0229* (2013.01);
(Continued)

(58) Field of Classification Search
CPC .. B41J 2/14233; B05C 5/0262; B05C 5/0279; B05C 11/1002; B05C 11/1005;
(Continued)

(56) References Cited

U.S. PATENT DOCUMENTS 4,640,742 A * 2/1987 Helleur ..................... D21F 1/02
162/212
5,421,941 A * 6/1995 Allen .................... B05C 5/0279
156/244.11
(Continued)

FOREIGN PATENT DOCUMENTS

EP  1637330 A1  3/2006
JP  08-243461  9/1996
(Continued)

OTHER PUBLICATIONS

International Search Report and Written Opinion of the International Searching Authority, dated Jan. 16, 2014, issued in related PCT Application No. PCT/US2013/038652.
(Continued)

Primary Examiner — Karl Kurple
(74) Attorney, Agent, or Firm — Dicke Billig & Czaja PLLC

(57) ABSTRACT

A coater assembly includes an array of side-by-side selectively closable slot portions to control pressurized fluid flow onto a substrate during relative movement between the coater assembly and the substrate to form a coating pattern on the substrate. A control module produces the coating pattern via control over selective independent closure of the slot portions based on a mapping matrix of individually addressable coatable elements.

14 Claims, 9 Drawing Sheets

(51) Int. Cl.
*B41F 23/00* (2006.01)
*B29C 48/31* (2019.01)
*B05D 1/26* (2006.01)

(52) U.S. Cl.
CPC .......... *B05C 11/1002* (2013.01); *B41F 23/00* (2013.01); *B05D 1/265* (2013.01); *B29C 48/31* (2019.02); *B29C 48/313* (2019.02)

(58) Field of Classification Search
CPC ... B05C 11/1034; B05C 5/0229; B05C 5/025; B29C 48/31; B29C 48/313
See application file for complete search history.

(56) References Cited

U.S. PATENT DOCUMENTS

| | | | |
|---|---|---|---|
| 5,587,184 A * | 12/1996 | Leonard | B29C 47/0021 425/133.5 |
| 5,656,086 A * | 8/1997 | Hultzsch | B05C 5/0254 118/410 |
| 5,700,325 A * | 12/1997 | Watanabe | B05C 5/0254 118/411 |
| 5,720,820 A | 2/1998 | Boger et al. | |
| 5,770,129 A * | 6/1998 | Monti | B29C 48/30 264/40.1 |
| 5,847,732 A * | 12/1998 | Shinozaki | B41J 2/005 347/51 |
| 5,989,622 A * | 11/1999 | Iwashita | B05C 5/0254 427/256 |
| 6,139,637 A * | 10/2000 | Takahashi | B05C 5/004 118/410 |
| 6,299,286 B1 * | 10/2001 | Matsumoto | B05C 5/007 347/21 |
| 6,325,853 B1 | 12/2001 | Hogan et al. | |
| 6,344,088 B1 * | 2/2002 | Kamikihara | B05C 5/0254 118/712 |
| 6,375,311 B1 * | 4/2002 | Kuramoto | B41J 2/005 347/54 |
| 6,418,604 B1 * | 7/2002 | Edman | B29C 47/0021 29/407.04 |
| 6,443,639 B1 | 9/2002 | Thering et al. | |
| 6,467,893 B1 * | 10/2002 | Matsumoto | B05C 5/007 347/43 |
| 6,517,178 B1 * | 2/2003 | Yamamoto | B05C 5/0254 347/15 |
| 6,792,854 B2 | 9/2004 | Tafel | |
| 6,911,671 B2 * | 6/2005 | Marcus | C23C 14/12 257/79 |
| 7,052,551 B2 * | 5/2006 | Shida | H01M 4/0404 118/669 |
| 7,467,452 B2 * | 12/2008 | Lande | B05D 1/265 29/407.09 |
| 7,604,842 B2 * | 10/2009 | Shida | B05C 5/0258 427/115 |
| 8,038,285 B2 * | 10/2011 | Uemura | B41J 2/0057 347/103 |
| 8,177,338 B2 | 5/2012 | Andrews et al. | |
| 8,875,653 B2 * | 11/2014 | Cobb | B41J 2/005 118/313 |
| 9,004,001 B2 * | 4/2015 | Fork | B29C 47/026 118/223 |
| 9,067,230 B2 * | 6/2015 | Heo | B05C 5/0262 |
| 2002/0024544 A1 * | 2/2002 | Codos | B41J 3/4073 347/8 |
| 2002/0158953 A1 * | 10/2002 | Matsui | B41J 11/0065 347/101 |
| 2002/0166232 A1 * | 11/2002 | Fujita | B05C 5/027 29/890.1 |
| 2002/0196319 A1 * | 12/2002 | Slenes | B41J 2/055 347/94 |
| 2005/0120947 A1 | 6/2005 | Sone et al. | |
| 2007/0098891 A1 * | 5/2007 | Tyan | C23C 14/228 427/248.1 |
| 2008/0012904 A1 * | 1/2008 | Silverbrook | B41J 15/044 347/56 |
| 2008/0178799 A1 * | 7/2008 | Kohno | B05C 5/005 118/313 |
| 2008/0308037 A1 * | 12/2008 | Bulovic | B05B 17/0638 118/302 |
| 2009/0246395 A1 * | 10/2009 | Naruse | B05C 1/08 427/428.06 |
| 2010/0117254 A1 * | 5/2010 | Fork | B29C 47/0021 264/129 |
| 2011/0050764 A1 | 3/2011 | Birecki et al. | |
| 2012/0164348 A1 * | 6/2012 | Zimmermann | B05C 5/005 427/555 |
| 2012/0313274 A1 * | 12/2012 | Loukusa | B05C 5/0262 264/40.1 |
| 2012/0315378 A1 | 12/2012 | Yapel et al. | |
| 2013/0236651 A1 * | 9/2013 | Komatsubara | B05C 21/00 427/430.1 |
| 2013/0328977 A1 * | 12/2013 | Marcus | B41J 2/005 347/75 |
| 2014/0186530 A1 * | 7/2014 | Harris | B05C 5/0258 427/256 |
| 2016/0325295 A1 * | 11/2016 | Li | H01L 21/00 |

FOREIGN PATENT DOCUMENTS

| | | |
|---|---|---|
| WO | WO-03070469 A1 | 8/2003 |
| WO | WO-2011017638 | 2/2011 |
| WO | WO-2012170713 | 12/2012 |

OTHER PUBLICATIONS

Le, H.P.; Progress and Trends in Ink-jet Printing Technology; Nov. 3, 1997; http://www.imaging.org/ist/resources/tutorials/inkjet.cfm> On pp. 49-62; vol. 42; Issue: 1.
Cohen, Edward DR., What is the patch-coating process, and why is it used?, Converting Quarterly, Apr. 4, 2013, 2 pages.
Mirwec Film Inc., Patch Coating System, http://www.mirwecfilm.com/slotdie/patchcoat.htm, 2012, 1 page.

* cited by examiner

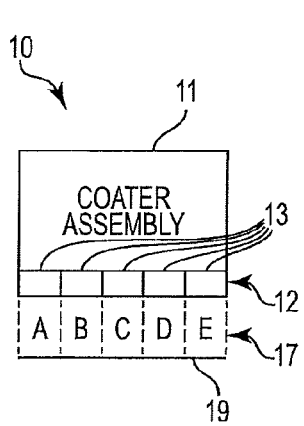
Fig. 1A
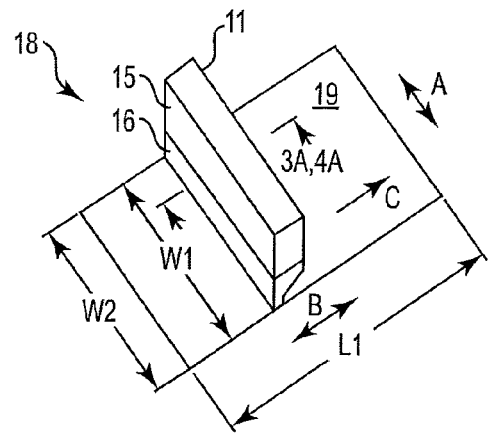
Fig. 1B
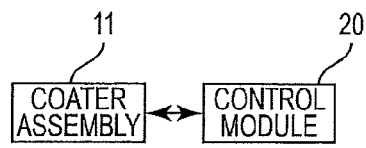
Fig. 1C
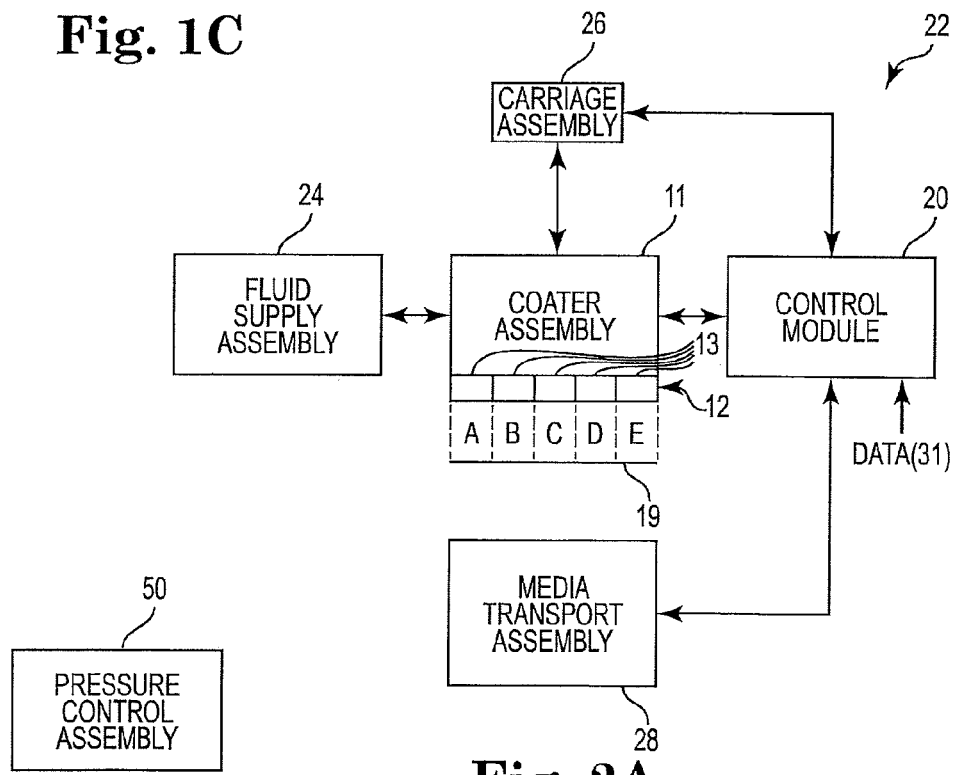
Fig. 2A
Fig. 2B

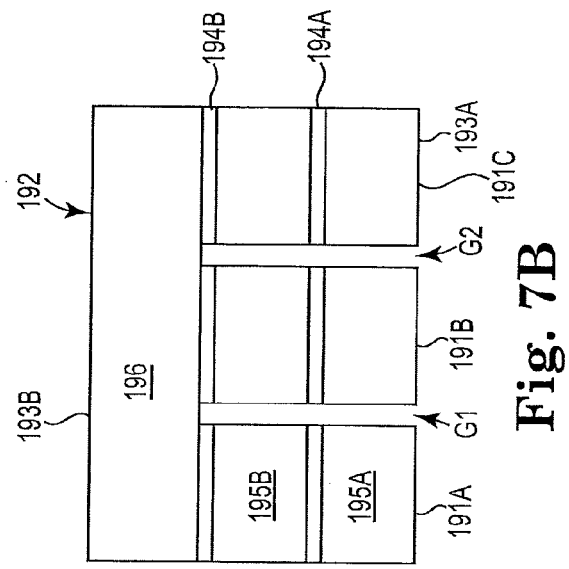
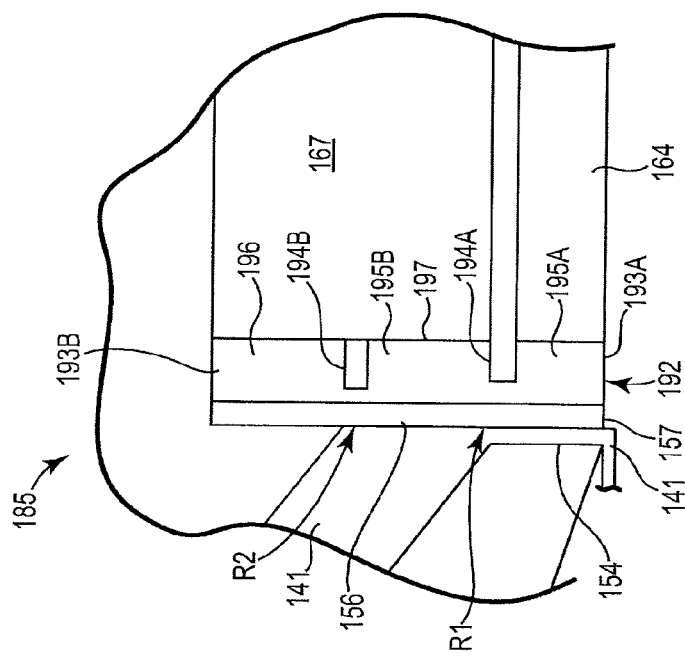
Fig. 7A
Fig. 7B

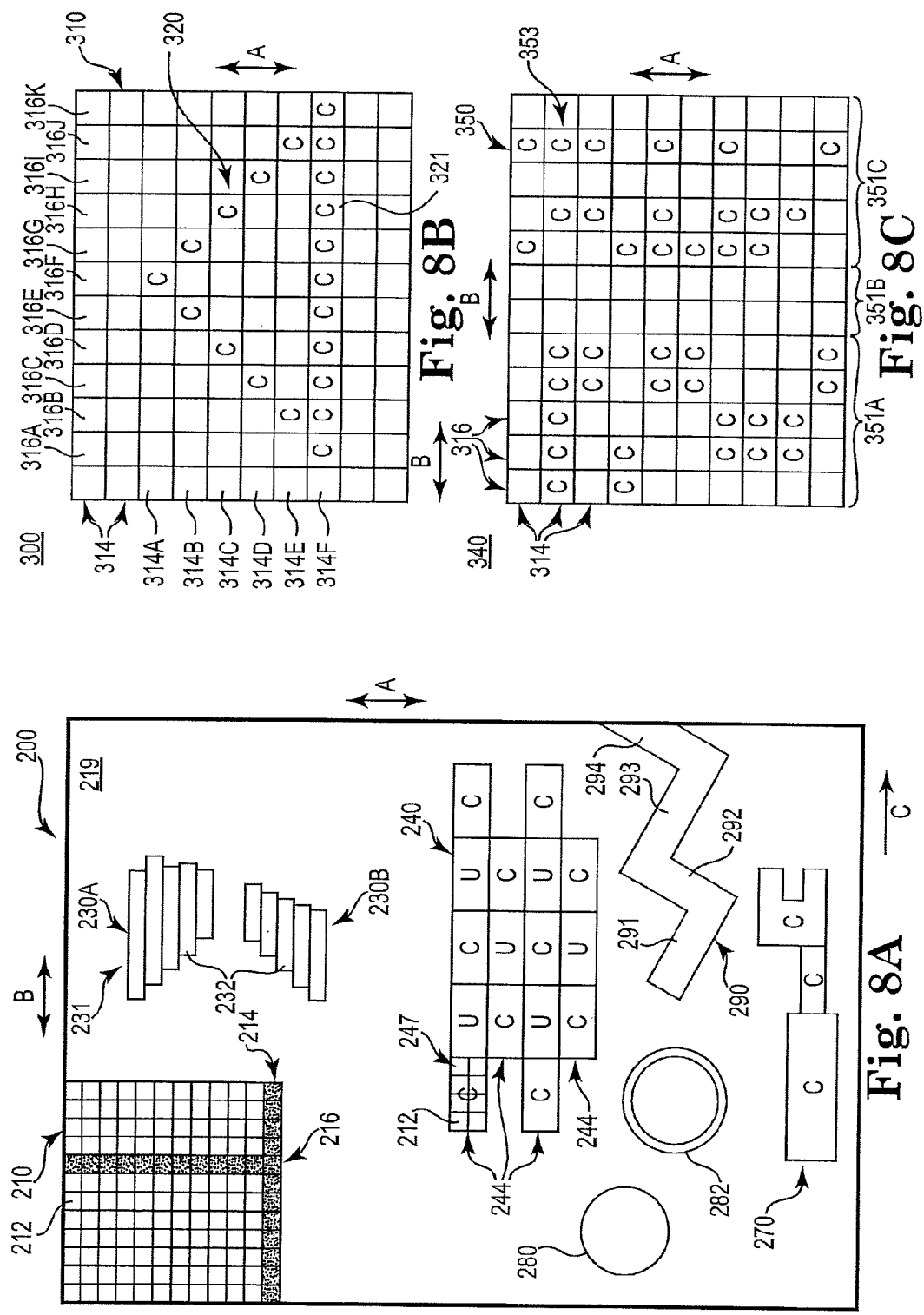

SELECTIVE SLOT COATING

BACKGROUND

Many types of printed articles include a coating on top of a printed surface for protection against moisture and/or for general durability. However, such coatings are typically applied selectively on just some portions of a printed article because later processing steps sometimes involve printing labels or serial numbers onto the article or sometimes involve receiving deposits of glue when the printed article forms packaging.

BRIEF DESCRIPTION OF THE DRAWINGS

FIG. 1A is a block diagram schematically illustrating a coating assembly, according to one example of the present disclosure.

FIG. 1B is a perspective view schematically illustrating a coating assembly in coating relation to a substrate, according to one example of the present disclosure.

FIG. 1C is a block diagram schematically illustrating a coating system, according to one example of the present disclosure.

FIG. 2A is a block diagram schematically illustrating a coating system, according to one example of the present disclosure.

FIG. 2B is a block diagram schematically illustrating a pressure-volume assembly, according to one example of the present disclosure.

FIG. 7A is a partial sectional side view schematically illustrating a coater assembly, according to one example of the present disclosure.

FIG. 7B is a front plan view schematically illustrating a backing element, according to one example of the present disclosure.

FIG. 8A is a diagram schematically illustrating various coating-related patterns on a substrate, according to one example of the present disclosure.

FIG. 8B is a diagram schematically illustrating a coating pattern on a substrate, according to one example of the present disclosure.

FIG. 8C is a diagram schematically illustrating a coating pattern on a substrate, according to one example of the present disclosure.

DETAILED DESCRIPTION

Figure 3A:
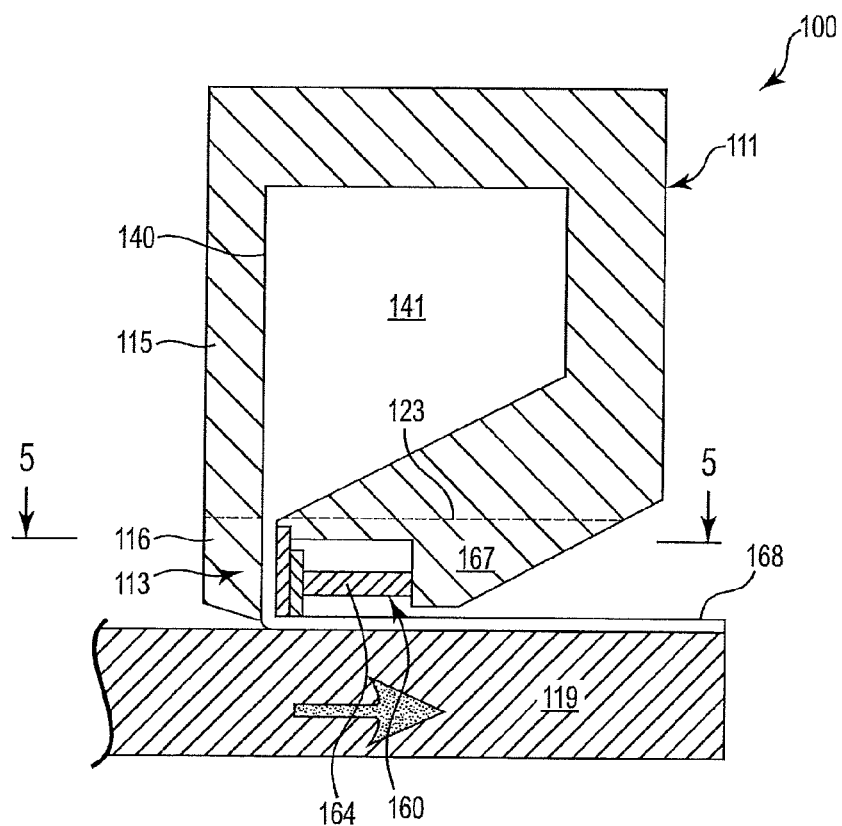
FIG. 3A is a side sectional view of a coater assembly, as taken along lines 3A-3A of FIG. 1B, schematically illustrating a representative slot portion in an open position, according to one example of the present disclosure.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense.

At least some examples of the present disclosure provide systems and assemblies for selective coating of a substrate via slot coating in which the slot is apportioned into a series of side-by-side slot portions. In general terms, by controlling which slot portions are open or closed, and by controlling a duration for which each respective slot portion is open or closed, coating material is applied to a substrate in a desired pattern. Using information about the width of each slot portion and about the shortest duration for which a slot portion can be open or closed, a matrix of addressable elements is constructed by which the coating pattern is mapped according to which addressable elements of the matrix are selected for coating (or for which coating is omitted).

Accordingly, in one aspect, at least some examples of the present disclosure function as a digital coating system in the sense that the coatable surface of a substrate is mapped according to addressable discrete units and coating occurs on a unit-by-unit basis depending on whether a particular addressable coating unit is designated to be in an "on" state (i.e. coating to occur) or an "off" state (i.e. coating not to occur).

In one example, a coating system includes a coater assembly and a control module. The coater assembly includes a first portion to contain a pressurized volume of fluid. A second portion of the coater assembly includes an array of side-by-side selectively closable slot portions to control pressurized fluid flow from the first portion (via the slot portions) onto a substrate during relative movement between the coater assembly and the substrate. In one aspect, the array of slot portions extends in a first orientation generally transverse to a substrate advance direction.

The control module provides control over selective independent closure of each respective slot portion to form a coating pattern on the substrate according to a mapping matrix of individually addressable uniformly-sized coatable elements. By designating a particular coatable element as being in an "on" state, selected elements of the mapping matrix cause flow of coating material from correspondingly located slot portions and based on a timing schedule via the control module. On the other hand, coatable elements designated as being in an "off" state do not receive coating material from the slot portions.

For example, one traditional method of applying overcoating includes flexographic overcoating, which includes placing a blanket over a printed article with the blanket including a pattern of gaps corresponding to areas of the printed article that are not intended to receive an overcoat Among other steps, this technique involves first cutting a pattern in a blanket, applying coating to the blanket, covering the printed article, and then transferring the overcoating material from the patterned blanket to substrate. A different patterned blanket is used for each different desired coating pattern. In one aspect, this "analog" technique may be reasonable when a large quantity of printed articles will receive the same overcoating pattern. However, in other situations, such as when printed articles are produced via high speed digital printing, the traditional overcoating technique is cumbersome, slow, and costly when rapid changes occur between different print jobs. Moreover, in the traditional overcoating technique, a large volume of material is wasted because a different blanket pattern is created for each different flexographic overcoating job and significant quantities of the coating material are wasted.

In sharp contrast to such traditional coating techniques, selective slot coating performed according to at least some examples of the present disclosure achieves desired coating patterns on a substrate without the use of a patterned blanket. This arrangement saves considerable resources in time, materials, and cost as compared to traditional coating techniques. Moreover, via at least some examples of the present disclosure, it would even be feasible to change the type of coating pattern from one printed article to the next to-be-coated printed article.

Moreover, selective slot coating achievable via at least some examples of the present disclosure provides considerable cost savings over other custom coating techniques that use thermal inkjet printheads to apply a coating material because of the relatively large cost of implementing and operating such on-demand fluid ejection devices.

Instead, in at least some examples of the present disclosure, the pressurized fluid flow made available via a slot-based application system provides a much less expensive way to apply the coating material onto the substrate with the controllable slot portions regulating where coating is applied or prevented from being applied. In this arrangement, in at least some examples of the present disclosure, the default action is the application of coating material via a pressurized fluid flow onto the substrate through open slot portions, such that affirmative, individual repetitive actions (e.g. fluid ejection via thermal inkjet printheads) need not take place to deposit coating material on the substrate. Rather, with a general flow state occurring via a coater assembly (in at least some examples of the present disclosure), selective closure of some slot portions at appropriate points in time (and for an appropriate duration) and at appropriate locations along the width of the coater assembly, produces a desired coating pattern on the substrate.

These examples, and additional examples, of the present disclosure are described and illustrated in association with FIGS. 1A-11.

FIG. 1A is a block diagram schematically illustrating a coating system 10, according to one example of the present disclosure. As shown in FIG. 1A, the coating system 10 includes a coater assembly 11 positioned in coating relation to a substrate, such as a printed article. In one example, the coater assembly 11 is positioned vertically above the substrate 19.

The coater assembly 11 includes an array 12 of slot portions 13 arranged in a generally side-by-side manner to selectively apply a coating in zones (denoted generally by 17) A, B, C, D, E across a width of the substrate 19. It will be understood that while five zones are shown in FIG. 1A, there can be fewer or greater than five zones. However, in one example, the number and position of zones corresponds to the number and position of slot portions 13 of array 12.

FIG. 1B is a perspective view of a coating system 18, according to one example of the present disclosure. As shown in FIG. 1B, coating system includes a coater assembly 11 and a support (carrying substrate 19 thereon) arranged for movement relative to each other. In one aspect, a width (W2) of the coater assembly 11 extends generally along a first orientation (represented by arrow A) that is generally transverse to a second orientation (represented by arrow B), along which the coater assembly 11 and substrate 11 are movable relative to each other. In general terms, width (W2) of coater assembly 11 is generally the same as, or wider than, the width (W1) of the substrate 19.

In one aspect, relative movement (as represented by directional arrow C) between coater assembly 11 and substrate 19 occurs until substantially the entire substrate 19 has been scanned by the coater assembly 11 to deposit coating material on selected portions of substrate 19.

In one aspect, coater assembly 11 includes a first portion 15 and a second portion 16 in fluid communication with first portion 15. The first portion 15 contains a volume of fluid such as a coating material while the second portion 16 includes an array 12 of slot portions 13 (FIG. 1) to direct pressurized fluid flow from the first portion 15 onto the substrate 19 in selective coating patterns, as further described throughout this disclosure. In one aspect, coater assembly 11 defines a slot coater having individually controllable slot portions extending along a width (W2) of the second portion 16, which generally extends across a width (W1) of the substrate 19.

As shown in FIG. 1C, in some examples of the present disclosure, the coater assembly 11 forms part of a coating system that includes a control module 20. In general terms, the control module 20 controls which locations on the substrate 19 will be coated or left uncoated by coater assembly 11. In some examples, the control module 20 implements such coating patterns via a mapping matrix of addressable coatable elements and assigning whether each addressable element is either coated or left uncoated. In one aspect, strings of addressable elements, groups of addressable elements, and/or isolated addressable elements are assigned to be coated to achieve a desired coating pattern. In some examples, each addressable element has a width generally corresponding to a width of a respective one of slot portions 13 and has a length generally corresponding to a selectable duration that the respective slot portions 13 remain in an open state or in a close state.

FIG. 2A is a block diagram of a coating system 22, according to one example of the present disclosure. As shown in FIG. 2, coating system 22 includes a coater assembly 11, a fluid supply assembly 24, a carriage assembly 26, a media transport assembly 28, and a control module 20. As previously described in association with FIGS. 1A-1B, coater assembly 11 includes slot portions 13 which selectively direct pressurized flow of coating material toward a print substrate or media 19 so as to selectively coat substrate 19. Substrate 19 is any type of printable media, such as a suitable sheet material that includes, but is not limited to, paper, card stock, envelopes, labels, transparencies, Mylar, and the like. In some examples, the substrate 19 already includes printed material on at least a top surface of the substrate 19. By selectively opening and closing the independently controllable slot portions 13, coating is selectively applied in zones A, B, C, D, and E as coater assembly 11 and substrate 19 are moved relative to each other.

Fluid supply assembly 24 supplies fluid to coater assembly 11 and in some examples, supplies fluid to a reservoir (e.g. first portion 15 in FIG. 1B) forming part of coater assembly 11 with the first portion 15 directly supplying fluid to the slot portions 13 of second portion 16. As such, fluid flows from fluid supply assembly 24 to coater assembly 11. In one example, coater assembly 11 and fluid supply assembly 24 are housed together in a single unit. In some examples, fluid supply assembly 24 is separate from coater assembly 11 but still directly communicates fluid to the coater assembly 11 via a releasable connection with the fluid supply assembly 24 being mounted directly above and at least partially supported by the coater assembly 11. This example is sometimes referred to as an on-axis configuration of the fluid supply assembly 24.

However, in other examples, the fluid supply assembly 24 is positioned remotely from the coater assembly 11, with the fluid supply assembly 24 communicating fluid to the on-board reservoir portion (e.g. first portion 15 in FIG. 1B) of the coater assembly 11 via an array of supply tubes. This embodiment is sometimes referred to as an off-axis configuration of the fluid supply assembly 24.

In some examples, carriage assembly 26 moves coater assembly 11 relative to media transport assembly 28. In some examples, media transport assembly 28 moves print media 19 relative to coater assembly 11. In either case, a coating zone 17 is defined adjacent to slot portions 13 in an area between coater assembly 11 and media or substrate 19.

In another aspect, control module 20 communicates with coater assembly 11, media transport assembly 28, and, in one example, carriage assembly 26. It will be understood that via its communication with coater assembly 11, control module 20 also communicates with fluid supply assembly 24.

In some examples, control module 20 receives data 31 from a host system, such as a computer, and includes memory for temporarily storing data 31. Typically, data 31 is sent to coating system 20 along an electronic, infrared, optical or other information transfer path. Data 31 represents, for example, a coating pattern to be applied to a printed article having text, images, graphics already printed thereon. As such, data 31 forms a coating job for coating system 20 and includes coating job commands and/or command parameters.

In one example, control module 20 provides control of coater assembly 11 including timing control for pressurized flow of a coating material selectively from slot portions 13. As such, control module 20 operates to define a pattern of coating material which selectively covers targeted portions of print media 19. Timing control and, therefore, the pattern of pressurized fluid flow, is determined by coating job commands and/or command parameters associated with a particular printed article to be coated. In one embodiment, logic and drive circuitry that forms a portion of control module 20 is located on coater assembly 11. In another embodiment, such logic and drive circuitry is located remotely from coater assembly 11.

As shown in FIG. 2B, in one example the coating system 20 (FIG. 2A) further includes a pressure-volume regulator assembly 29 which, in cooperation with fluid supply assembly 22, regulates the pressure exerted on fluid and/or the volume of fluid in the coater assembly 11. In particular, during a coating job, as rapid changes may occur as to which slot portions 13 are open or closed at any given point in time, the pressure-volume regulator assembly 29 acts to locally adjust the volume of fluid and/or the applied pressure to ensure consistent pressure on fluid at slot portions 13. In addition, in situations in which significant rapid changes in pressure might otherwise occur, such as immediately and simultaneously closing all slot portions 13 as part of a coating job, the pressure-volume regulator assembly 29 manages alternate routes for fluid to relieve the pressure and/or directly reduces the pressure applied to the fluid in coater assembly 11. Similarly, the pressure-volume regulator assembly 29 uses the same capabilities to accommodate the impact of simultaneously opening all the slot portions. By compensating in this manner, a coating job can continue uninterrupted while maintaining desired quality coating performance.

FIG. 3A is a side sectional view of a coater assembly 111 of a coating system 100, according to one example of the present disclosure. In one example, the coating system 100 (including coater assembly 111) comprises at least substantially the same features and attributes as at least some of the example coating systems 10, 22 (including coater assembly 11), as previously described in association with at least FIGS. 1A-2A.

As shown in FIG. 3A, coater assembly 111 includes a first portion 115 to contain a pressurized volume of fluid 141 within reservoir 140 and a second portion 116 that is in communication with the first portion 115. Dashed line 123 schematically differentiates the first portion 115 from the second portion 116. The second portion 116 includes one slot portion 113 (of an array 112 of slot portions 113) that is positioned, sized, and arranged to control flow of fluid 141 onto substrate 119 in at least part of an overall coating pattern. As further shown in FIG. 3A, in one example opening and closing of slot portion 113 is controlled via actuator 160. As further shown in FIGS. 3A-3B, an arm 164 of actuator 160 is in a retracted position thereby causing slot portion 113 to be in an open position, which in turn allows pressured flow of fluid 141 onto substrate 119 to form overcoating 168.

While FIG. 3A depicts a particular direction of movement of substrate 119 relative to dispenser assembly 111, it will be understood that in some examples, the relative motion occurring between the dispenser assembly 111 and the substrate results in the substrate 119 "moving" in a direction opposite that shown in FIG. 3A such that the overcoating 168 is applied onto substrate 119 in a direction moving away from actuator 160.

Figure 3B:
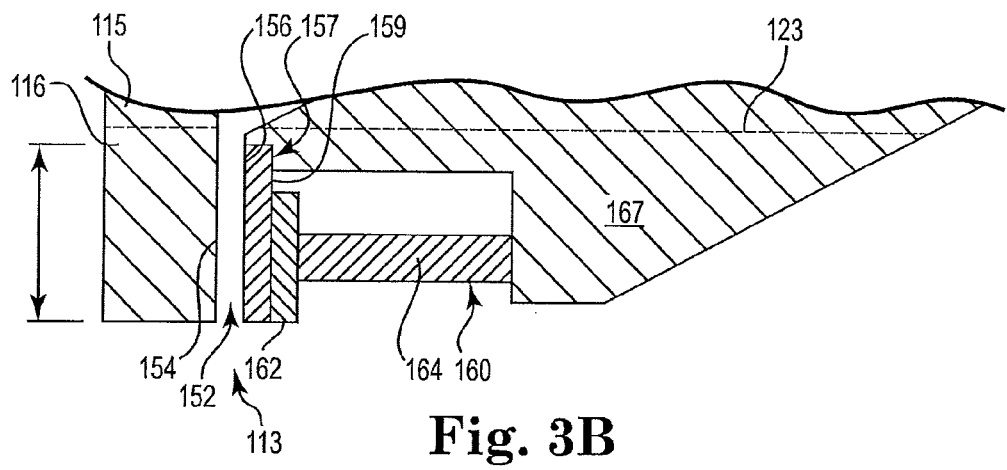
FIG. 3B is an enlarged partial view of the coating assembly shown in FIG. 3A, according to one example of the present disclosure.

FIG. 3B provides an enlarged view of first portion 116 of coater assembly 111, according to one example of the present disclosure. As shown in FIG. 3B, in an open state, slot portion 113 defines a gap 152 between a first surface portion 154 and an oppositely-facing second surface portion 156 that is generally parallel to first surface portion 154. In one example, for each slot portion 113, the first surface portion 154 includes a generally rigid member and the second surface portion 156 forms one portion of a resilient, generally flexible member 157. In another aspect, the actuator 160 includes a selectively extendible arm 164 and an end portion 162 in contact with a backside 159 of the generally flexible member 157. In some examples, the end portion 162 is secured to the generally flexible member 157 while in some examples, the end portion 162 of actuator 160 releasably engages the backside 159 of the generally flexible member 157. In some examples, the end portion 162 comprises a generally rigid member providing a generally planar member for engaging the generally flexible member 157.

Accordingly, in one aspect, FIGS. 3A-3B demonstrate one slot portion 113 in its open position and by which fluid 141 flows through slot portion 113 and onto substrate 119 to form a patterned coating.

Figure 4A:
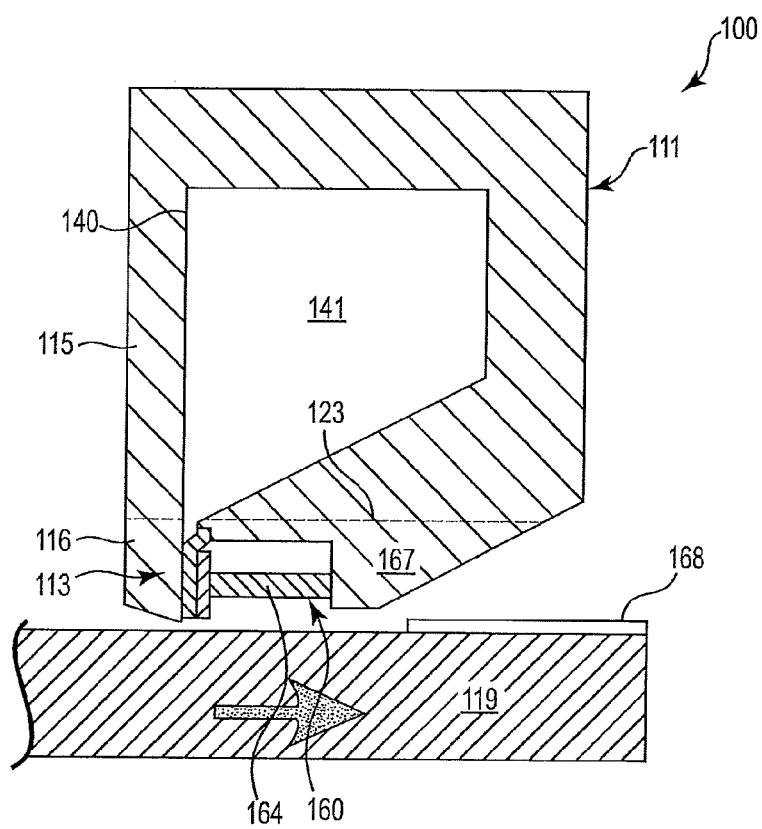
FIG. 4A is a side sectional view of a coater assembly, as taken along lines 4A-4A of FIG. 1, schematically illustrating a representative slot portion in a closed position, according to one example of the present disclosure.

FIG. 4A is a side sectional view of a coater assembly 111 of FIGS. 3A-3B, except with slot portion 113 in a closed position and thereby preventing fluid flow through that particular slot portion 113 (of an array of side-by-side slot portions).

Figure 4B:
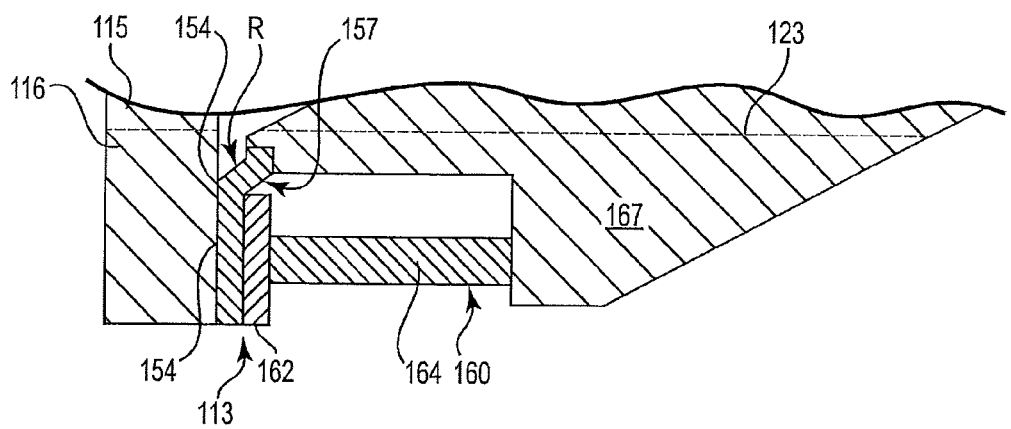
FIG. 4B is an enlarged partial view of the coating assembly shown in FIG. 4A, according to one example of the present disclosure.

As best seen in FIG. 4B, extension of arm 164 of actuator 160 pushes second surface portion 156 into pressing, sealing contact against first surface portion 154 of slot portion 113. In one aspect, the generally flexible member 157 permits bending and/or stretching in the region R extending from body 167 of coater assembly 111, yet exhibits resiliency to return to the shape shown in FIG. 3A when slot portion 113 is caused to return to the open position.

In one example, opening of slot portion 113 (FIGS. 3A-3B) and closing of slot portions 113 (FIGS. 4A-4B) is governed by control module 120, as previously described in association with FIGS. 1A-2C, and will be described in association with at least FIGS. 8A-8C and/or at least FIGS. 9A-9D.

Figure 5:
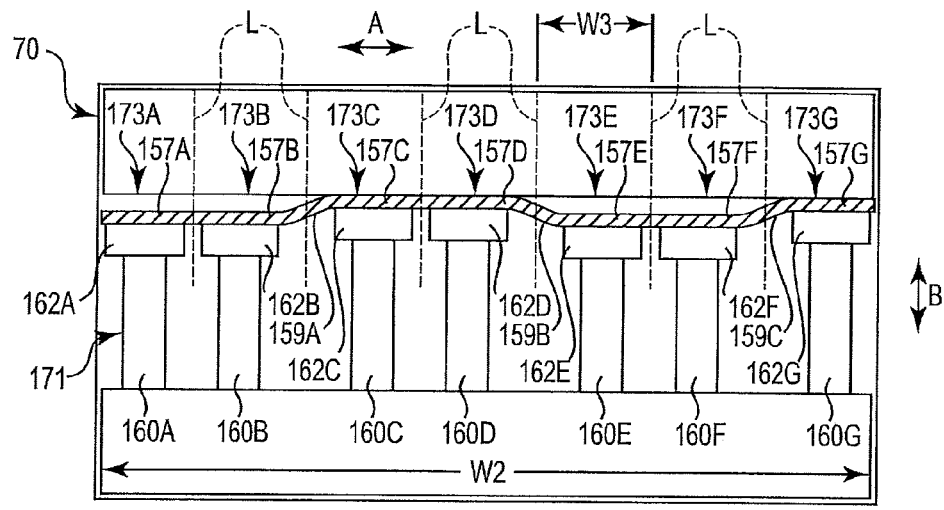
FIG. 5 is a top plan view schematically illustrating an array of slot portions of a coater assembly, according to one example of the present disclosure.

FIG. 5 is a top sectional view, as taken along lines 5-5 of FIG. 3A, schematically illustrating second portion 170 of coater assembly 111, according to one example of the present disclosure. In one aspect, second portion 170 provides just one example of a second portion 116 of coater assembly 111 (FIGS. 3A-4B). As such, second portion 170 comprises an array of side-by-side slot portions 173A-173G extending along a width of the coater assembly 111 with each such slot portion being associated with an actuator 160A of array 171 of actuators 160A-160G. In one aspect, for illustrative purposes dashed lines L generally designate a lateral boundary of each slot portion.

In one example, the actuators 160A-160G are spaced apart from each other in a generally uniform manner. Each actuator 160A includes a respective end portion 162A-162G coupled to generally flexible member 157. In one aspect, while flexible member 157 generally defines a single member, FIG. 5 schematically illustrates flexible member 157 as having different portions 157A, 157B, 157C, 157D, 157E, 157F, and 157G with the state of a given member portion corresponding to an extended or retracted position of a respective one of the actuators 160A-160G.

In one example, member portion 159A represents a transition portion of member 157 extending between retracted actuator 160B and extended actuator 160C. Member portion 159B represents a similar transition portion between retracted actuator 160E and extended actuator 160D. Finally, member portion 159C represents a similar transition portion between retracted actuator 160F and extended actuator 160G.

In another aspect, a single slot portion (e.g. slot portion 173A) corresponds to a row of in a mapping matrix of addressable elements controlled via control module 20 (shown in at least FIGS. 1C, 2A), as will be further described in association with at least FIGS. 8A-8C. Moreover, each row in the matrix is associated with just one actuator. In another aspect, when each slot portion (e.g. 173A) is opened or closed according to a predefined duration of time, then each slot portion defines an addressable element of the mapping matrix by which coatable elements are designated.

In one aspect, the generous spacing shown between adjacent end portions 162A, 162B, etc. is provided for illustrative clarity regarding the transition portion (159A, 159B, 159C) extending between adjacent end portions (e.g. 162A, 162B) to demonstrate the flexure action of those transition portions and, in general, to better differentiate the different components, structures, and features of slot portions 173A-173G.

However, in at least some examples, in practice the outer edges of adjacent end portions (e.g. 162A, 162B) will be nearly immediately adjacent each other to provide distinct boundaries for each slot portion.

It will be further understood that coater assembly 117 is not strictly limited to the arrangement and spacing of actuators shown in FIG. 5, as in some examples the actuators can be positioned closer to each other than depicted in FIG. 5 and in some examples, the actuators are positioned further away than shown in FIG. 5.

Finally, in some examples, as shown in FIG. 5, two adjacent actuators 160A, 160B are activated together to simultaneously open two adjacent slot portions 173A, 173B because corresponding addressable elements (for a certain duration) were designated ahead of time to be in the "on" mode (i.e. a coating state). In addition, FIG. 5 also illustrates two actuators 160C, 160D are activated to simultaneously close slot portions 173C, 173D because corresponding addressable elements (for a certain duration) were designated ahead of time to be in the "off" mode (i.e. a non-coating state).

In another aspect, it will be understood that the number of adjacent slot portions that are activated simultaneously is merely illustrative and that more than two adjacent slot portions can be activated simultaneously into the same state or just one slot portion can be activated to change states (open or closed) with the state (open or closed) of adjacent slot portions remaining unchanged.

In some examples, the slot portions have a width (W3 in FIG. 5) extending along the first orientation (as represented by directional arrow A) that is at least two orders of magnitude greater than a length of substrate (e.g. substrate 19 in FIG. 1B) extending in the second orientation (as represented by directional arrow B) generally perpendicular to the first orientation.

In some examples, assuming a given velocity of relative movement between the substrate (e.g. substrate 19 in FIG. 2) and the coater assembly, a response time of the actuators (e.g. actuator 160A) at least partially determines a minimum length of addressable elements of the matrix by which coating patterns are mapped. Moreover, with further reference to at least FIG. 5, a width (W3) of the slot portions (e.g. slot portions 173A, 173B, etc.) defines a width of the addressable elements of the matrix by which coating patterns are mapped for application onto a substrate.

With this in mind, in some examples the slot portions (e.g. slot portions 173A, 173B, etc.) are sized and the actuators (as controlled via control module 20) are configured to provide a matrix of individually addressable, coatable elements having a width of 1 millimeter (extending the first orientation along arrow A) and a length of 1 millimeter (extending in a generally perpendicular, second orientation along arrow B).

In one aspect, each actuator (e.g. actuators 160A, 160B, etc.) is equipped to achieve opening and closure of a respective slot portion by the respective actuator having a range of motion on the order of 10 micrometers.

Figure 6A:
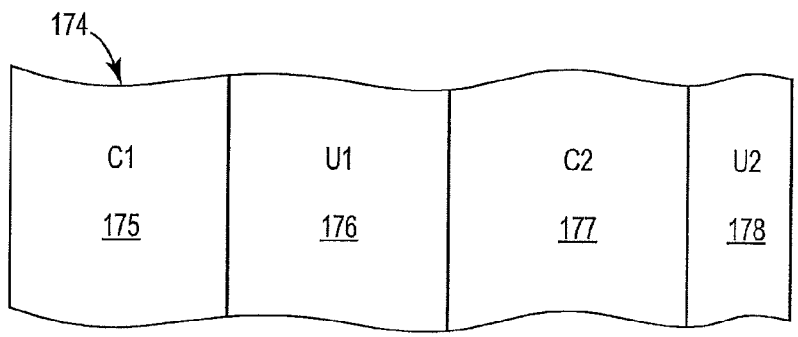
FIG. 6A is a top plan view schematically illustrating a coating pattern on a substrate, according to one example of the present disclosure.

FIG. 6A is a top plan view of a coating pattern 174 on a substrate, according to one example of the present disclosure, generally corresponding to the configuration of the slot portions shown in FIG. 5. It will be understood that, because the respective slot portions 113 of a coating assembly 111 are rapidly openable and closable independent of each other, the coating pattern shown in FIG. 6A corresponds to a snapshot or brief point in time and represents just one aspect of many different potential coating patterns. With this in mind, coating pattern 174 includes coated portions 175, 177 and non-coated portions 176, 177. In one example, the size of these respective coated and non-coated portions shown in FIG. 6A do not necessarily correspond to the size of addressable elements of the mapping matrix.

Figure 6B:
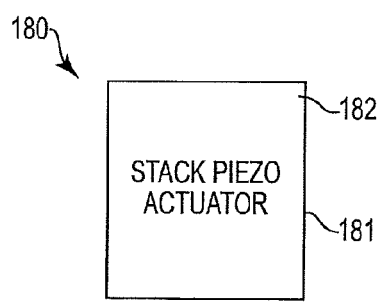
FIG. 6B is a block diagram schematically illustrating an actuator assembly, according to one example of the present disclosure.

FIG. 6B is a block diagram of an actuation portion 180 of a slot portion of a coating assembly, according to one example of the present disclosure. As shown in FIG. 7, actuation portion 180 includes a stack piezoelectric actuator 181. In one example, the stack piezoelectric actuator is obtainable from Steiner and Martins, Inc. (STEMiNC) of Miami, Fla. Upon application of an appropriate voltage, the stack piezoelectric actuator causes end portion 182 of the stack to extend a predetermined distance (e.g. 10 microns) and thereby push end portion 162 and generally flexible member 157 against the first surface portion 154 (as shown in FIG. 4A-4B) and thereby close a slot portion (e.g. slot portion 173A).

In some examples, movement of the end portion 162 and generally flexible member 157 is caused by other types of actuators, such as other types of electric actuators, pneumatic actuators, hydraulic actuators, etc.

FIG. 7A is a side sectional view schematically illustrating a coater assembly 185 while FIG. 7B is a front plan view of a portion of a backing element 192, according to one example of the present disclosure. In one example, coater assembly 185 includes at least some of substantially the same features and attributes as the coater assembly 111 shown in FIGS. 3A-3B, 4A-4B and the second portion 170 of coater assembly shown in FIG. 5.

In general terms, the examples previously described in association with FIGS. 3A-3B, 4A-4B, and 5 exhibit a general arrangement to implement independently openable and closable slot portions of a coater assembly. With this in mind, the backing element 192 illustrated in FIGS. 7A-7B is introduced as one comprehensive arrangement to provide a generally rigid end portion 162 to provide stiffness for generally flexible member 157 at the location of each actuator 160. In one aspect, this combination achieves reliable opening and sealable closing of each slot portion while still permitting some freedom of movement between adjacent slot portions and some freedom of movement in the vertical orientation.

With this in mind, as shown in FIG. 7B, the backing element 192 is made of a generally rigid material and includes a base 196 and an array of finger portions 191A, 191B, 193C extending generally parallel to each other and outward from the base 196. It will be understood that a backing element 192 would be formed with a number of fingers that correspond to the number of slot portions defined along slot.

With further reference to FIG. 7B, gaps G1, G2 extend between adjacent finger portions 191A, 191B, 191C. Each finger portion 191A includes a pair of hinge portions 194A, 194B which permit bendable movement between lower flap portion 195A and upper flap portion 195B, and bendable movement of upper flap portion 195B relative to the stationary base 196.

As seen in the side view of FIG. 7A, the backing element 192 is interposed between the generally flexible member 157 and the end of actuator arm 164, and between the generally flexible member 157 and frame portion 167. Moreover, in this sandwiched position, the base 196 is fixed to frame portion 167, while flap portions 195A, 195B are in releasable contact against frame portion 167. As further revealed via the side view of FIG. 7A, in some examples the hinge portions 194A, 194B are formed via cutouts 199 in each finger portion 191A, 191B, 191C. In some examples, the hinge portions 194A, 194 define a living hinge.

As further shown in FIG. 7A, lower flap portion 195A of backing element 192 is located in generally the same position as, and performs generally the same function, as end portion 162 in FIGS. 3A-3B, 4A-4B, and 5. Accordingly, lower flap portion 195A of each finger 191A, 191B, 191C provides one implementation of end portion 162 with a separate finger (e.g. 191A) being provided for each separate actuator and associated slot portion 152.

Accordingly, upon extension of arm 164 of actuator 160 in a movement like that shown FIGS. 4A-4B, the lower flap portion 195A would push generally flexible member 157 against surface 154 to close the slot portion 152. To accomplish this freedom of movement, hinge portion 194A permits pivotal bending of a finger (e.g. finger 191A) of the backing element 192 (at region R1 of the slot portion 152) and a small amount of bending at hinge portion 194B (at region R2) with the flap portions 195A, 195B of backing element 192 temporarily separating away from the frame portion 167 to enable the generally flexible member 157 to be pressed (via actuator arm 164) against surface 154. Upon retraction of the actuator arm 164, the hinge portions 194, 194B exhibit a resilient behavior as the finger portions (e.g. 191A) return to the position shown in FIG. 72.

With further reference to FIG. 7B, the gaps G1, G2 (between adjacent fingers 191A, 191B, 191C) in backing element 192 generally correspond to the location of portions of generally flexible member 157 that extend transversely between adjacent end portions 162, as shown in FIG. 5. Accordingly, with a lower flap portion 195A of each finger 191A, 191B, 191C acting as an end portion 162 of an actuator 160, the gaps G1, G2 allow independent movement of each lower flap portion 195A as each actuator 160 moves independently.

Accordingly, with the above-described configuration, the generally rigid backing element 192 provides stiffness to enable the generally flexible member 157 to be moved toward and away from an opposing wall surface 154 and to sealingly close the slot portions 152. In addition, by providing separate fingers 191A, 191B, 191C and hinge portions 194A, 194B along each finger, the backing element 192 also permits some freedom of movement to enable the generally flexible member 157 to stretch and flex (by a small amount) to accommodate the independently movable actuators 160 that drive the opening and closing of the slot portions.

FIG. 8A is a diagram 200 schematically illustrating several sample coating patterns 230, 240, 270, 280, 282, and 290 applied on a substrate 219, according to one example of the present disclosure. As shown in FIG. 8A, diagram 200 illustrates a mapping matrix 210 of individually addressable elements schematically overlaid on substrate 219. In one aspect, the individually addressable coatable elements 212 are arranged in rows 214 and columns 216. While FIG. 8A shows matrix 210 on just a portion of substrate 219 for illustrative purposes, it will be understood that in at least some examples, matrix 210 is sized to correspond to the size and shape of the entire substrate 219 so that the entire substrate 210 is mapped according to the individually addressable elements. This arrangement enables directing, with a high degree of precision and accuracy, which parts of substrate 219 are coated or intentionally left uncoated.

In another aspect, each individually addressable element 212 represents the smallest unit for which the coater system can form a coated portion or uncoated portion. In one aspect, in at least some instances, diagram 200 uses the reference character "C" to represent a coated portion and the reference character "U" to represent an uncoated portion.

In one aspect, via grouping multiple (individually addressable) coatable elements together, coated portions larger than the element 212 can be formed, some examples of which are shown in FIG. 8A and further described below.

In general terms, for any given coating job, a control module (e.g. control module 20 in FIGS. 1C, 2A) of a coating system (according to examples of the present disclosure) holds a mapping matrix of addressable elements 212 with select elements designated for coating to produce a coating pattern on a substrate 219. With this in mind, substrate 219 exhibits several different types of coating patterns achievable via a matrix 210 of individually addressable coating elements 212.

In one example, as shown in FIG. 8B, the coating pattern 231 includes two groups 230A, 230B of bars 232 in which the bars 232 are immediately adjacent each other, and each bar 232 starts at a slightly different location along the second orientation (represented by arrow B). The starting location of one bar 232 differs from the starting location of an adjacent bar 232 by the size of one addressable element 212 of matrix 210. The small but measurable and repeatable difference in the starting locations among adjacent bars 232 illustrates one example of the precision and accuracy achievable via the digital nature of applying coating material according to addressable elements 212 of matrix 210, in accordance with examples of the present disclosure.

As further illustrated in FIG. 8A, in one example a coating pattern 240 is produced by a coating system (e.g. coating system 10, 22, 100, etc.) with the coating pattern 240 having a checkered formation in which several uncoated portion (U) and several coated portions (C) are mingled amongst each other. For any given row 244, the coated portions (C) and uncoated portions (U) are arranged in an alternating manner. To achieve this pattern, at least one slot portion (of a coater assembly) would cycle between open and closed states upon each unit (or duration interval) of travel of the substrate in the substrate advance direction, where a unit of travel corresponds to a size of an addressable element.

In another example, each row 244 contains some coated elements and some uncoated elements but need not exhibit an alternating pattern.

In one example, as demonstrated via coated portion 247 (also identified via label C) of coating pattern 240 in FIG. 8A, each coated portion C is sized larger than a single addressable element 212. In particular, in the example of coating pattern 240, a group of addressable elements 212 together forms coating portion 247. In this arrangement, the coating portion 247 acts as a super-element, in which an entire group of addressable elements 212 is selectable as a single portion to be coated or left uncoated. In one example, any one of various naming or addressing schemes can be used to denote a group, such as the group of elements 212 that define and form coating portion 247.

In one aspect, FIG. 8A further illustrates a coating pattern 270 producible via a coating system, such as coating system 10, 22, 100 etc. (FIGS. 1A-2B, 3A-4B, etc.), according to one example of the present disclosure. As shown in FIG. 8A, coating pattern 270 is produced via designating a group of addressable elements 212 that correspond to a desired shape and size of a coating pattern.

In one example, FIG. 8A further illustrates coating patterns 280, 282 producible via a coating system (e.g. coating system 10, 22, 100, etc.), according to one example of the present disclosure. As shown in FIG. 8A, coating patterns 280, 282 are produced via designating a plurality of addressable elements 212 from matrix 210 to form a generally circular shape of coated elements. It will be understood that the relative smoothness of the outer edge of the circle depends on factors, such as the size of the diameter of the circle and the size of the addressable elements used to form the circle. In some examples, the addressable elements of matrix 210 are selected to form a generally ring-shaped coating pattern 282 on the substrate.

FIG. 8A further illustrates another example of a coating pattern 290 producible via coating systems 10, 22, 100, etc., in accordance with the present disclosure. As shown in FIG. 8A, coating pattern 290 defines a generally zigzag shape. It will be understood that the relative smoothness of the edges and/or corners of the zigzag shape depends on factors, such as the size (e.g. width, length) of the legs 291, 292, 293, 294 that form the zigzag shape and the size of the uniformly sized addressable elements of the matrix 210 from which elements are selected to be designated for coating.

Accordingly, as schematically illustrated via FIG. 8A, via application of a mapping matrix of addressable coatable elements, a great variety of coating patterns is achievable with a high degree of precision and accuracy, which doing so without a patterned blanket typically used in traditional overcoating techniques.

FIG. 8B is a diagram 300 schematically illustrating one coating pattern 320 formed from a matrix 310 (including rows 314 and columns 316) of selectable potentially coatable elements 312, according to one example of the present disclosure. In one example, the coating pattern 320 is produced via a coating system (such as coating system 10, 22, 100, etc.) of the present disclosure. As shown in FIG. 8B, the coating pattern 320 generally corresponds to a triangular shape with a base 321 of the triangle generally corresponding to and defined by at least a portion of row 314F of matrix 310. Meanwhile, a top vertex 323 of the triangle (opposite the base 321) is defined by a coated element having a location designated by row (314A) and column (316F). In a shortened notation, the coating element is located at address (314A, 316F). In a similar fashion, each of the coated elements defining the triangular coating pattern 320 is designated by an address specifying their location.

In some examples, other mechanisms and/or other nomenclature is used to designate unique addresses for each coatable element 312 of matrix 310 such that a control module (e.g. control module 20 in FIG. 2A) can designates a precise and accurate coating pattern via activating particular elements 312 of matrix for coating or not being coated, respectively.

In one aspect, the triangular coating pattern 320 illustrates a feature not readily achievable with an analog or traditional slot coater. In particular, one coated element (314D, 316I) is spaced apart from another coated element (314D, 316C) within the same row (314D). In the absence of a patterned blanket to provide selectivity regarding where and when a coating material is deposited (via slot coating) onto a substrate, traditional flexographic overcoating does not permit coating a single target coatable element (e.g. 314D, 316C) without applying coating material in a region just prior to the element (314D, 316B) and without coating a region (314D, 316D) just after the target coated element (314D, 316C). Moreover, in the absence of such patterned blankets, traditional coating does not enable coating an element (314D, 316C) and then strategically and precisely skipping a discrete number of (e.g. five) elements 312 of a matrix before coating another element (314D, 316I) in that same row 314D.

FIG. 8C is a diagram 340 schematically illustrating one coating pattern 353 formed from a matrix 350 of rows 314 and columns 316 of potentially coatable elements 312, according to one example of the present disclosure. In one example, the coating pattern 353 is produced via a coating system (such as coating system 10, 22, 100, etc.) of the present disclosure. In one example, the coating pattern 353 includes a first portion 351A, an intermediate second portion 351B, and a third portion 351C. The first portion 351A includes columns 316 having coated elements 312 in at least some rows 314 of matrix 350 and the third portion 351C includes columns 316 having coated elements in at least some rows 314 of matrix 350. However, the addressable elements 312 of intermediate second portion 351B include no coated elements in the columns 316 defining the second portion 351B.

In one aspect, the particular positioning of intermediate second portion 351B along the second orientation (represented by arrow B) is provided merely for illustrative purposes. In particular, the intermediate second portion 351B need not be located centrally along a length of a substrate and need not be at a midportion between such first and second portions 351A, 351C.

In another aspect, the coating pattern 353 in FIG. 8C demonstrates the ability of coating system during an ongoing coating job, in cooperation with control module 20, to abruptly stop fluid flow simultaneously at all slot portions of the coater assembly (as part of the coating job) and then, as shown in third portion, to abruptly resume fluid flow via selected slot portions (as part of the same, ongoing coating job) to form any desired pattern per the mapping matrix of addressable coatable elements 312. As will further described later in association with FIG. 9D, a coating manager of a control module governs regulation of pressure and volume of fluid to implement such abrupt changes in fluid flow in the coating assembly while the coating system also is equipped with a pressure-volume regulator assembly 29, as previously described in association with FIG. 2B.

It will be understood that the coating pattern 353 does not necessarily define the coating pattern for an entire substrate, but rather is merely representative of one type of coating pattern producible via coating systems, including control module, according to at least some examples of the present disclosure.

Figure 9A:
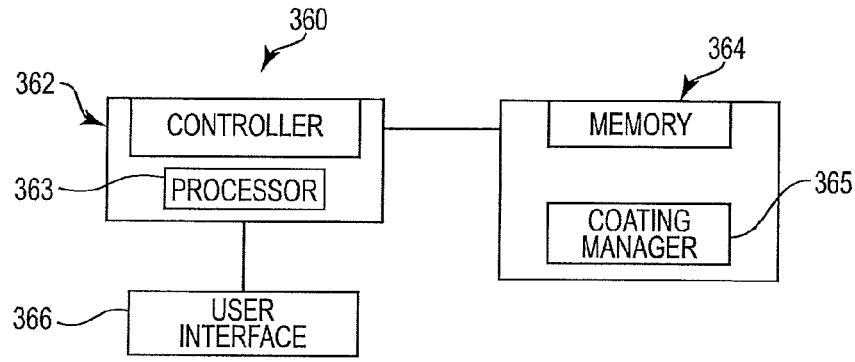
FIG. 9A is a block diagram schematically illustrating a control portion of a coating system, according to one example of the present disclosure.

FIG. 9A is a block diagram schematically illustrating a control portion 360 of a coating system, according to one example of the present disclosure. As shown in FIG. 9A, control portion 360 includes at least some of substantially the same features and attributes as controller 30, as previously described in association with at least FIGS. 1B, 2A. In some examples, control portion 360 includes a controller 362, a memory 364, and a user interface 366.

In general terms, controller 362 of control portion 360 comprises at least one processor 363 and associated memories that are in communication with memory 364 to generate control signals directing operation of at least some components of the systems and components previously described in association with at least FIGS. 1-4B. In some examples, these generated control signals include, but are not limited to, directing operation of a coater assembly (e.g. coater assembly 11), including independent selectable opening and closure of slot portions (e.g. slot portions 13). In particular, in response to or based upon commands received via a user interface 366 and/or machine readable instructions (including software), controller 362 generates control signals to direct operation of a coating assembly 11, 111, etc. and in accordance with at least some of the previously described examples and/or later described examples of the present disclosure. In one example, such operation includes forming coating patterns on a substrate via mapping the coating pattern according to a matrix of individually addressable coatable elements. In one example, controller 362 is embodied in a general purpose computer and communicates with a coating system while in other examples, controller 362 is incorporated within the coating system.

For purposes of this application, in reference to the controller 362, the term "processor" shall mean a presently developed or future developed processor (or processing resources) that executes sequences of machine readable instructions (such as but not limited to software) contained in a memory. Execution of the sequences of machine readable instructions, such as those provided via control module 20, memory 364 of control portion 360 and/or coating manager 370 (FIG. 9B) causes the processor to perform actions, such as operating controller 362 to form coating patterns in a manner generally described in at least some examples of the present disclosure. The machine readable instructions may be loaded in a random access memory (RAM) for execution by the processor from their stored location in a read only memory (ROM), a mass storage device, or some other persistent storage (e.g., non-transitory tangible medium or non-volatile tangible medium, as represented by memory 364. In one example, memory 364 comprises a computer readable tangible medium providing non-volatile storage of the machine readable instructions executable by a process of controller 362. In other examples, hard wired circuitry may be used in place of or in combination with machine readable instructions (including software) to implement the functions described. For example, controller 362 may be embodied as part of at least one application-specific integrated circuit (ASIC). In at least some examples, the controller 362 is not limited to any specific combination of hardware circuitry and machine readable instructions (including software), nor limited to any particular source for the machine readable instructions executed by the controller 362.

In some examples, user interface 366 comprises a graphical user interface or other display that provides for the simultaneous display, activation, and/or operation of the various components, functions, features, and of control module 20, control portion 360, and coating manager 370 as described in association with at least FIGS. 1A-8C. Moreover, it will be understood that the features, functions, modules, and components of the control module 20, control portion 360, and coating manager 370 as described throughout the disclosure can be arranged in different forms and groupings, and therefore the control module 20, control portion 360, and coating manager 370 (FIG. 9B) are not strictly limited to the particular arrangement or groupings of functions, modules, and components illustrated in FIGS. 1A-9D.

Figure 9B:
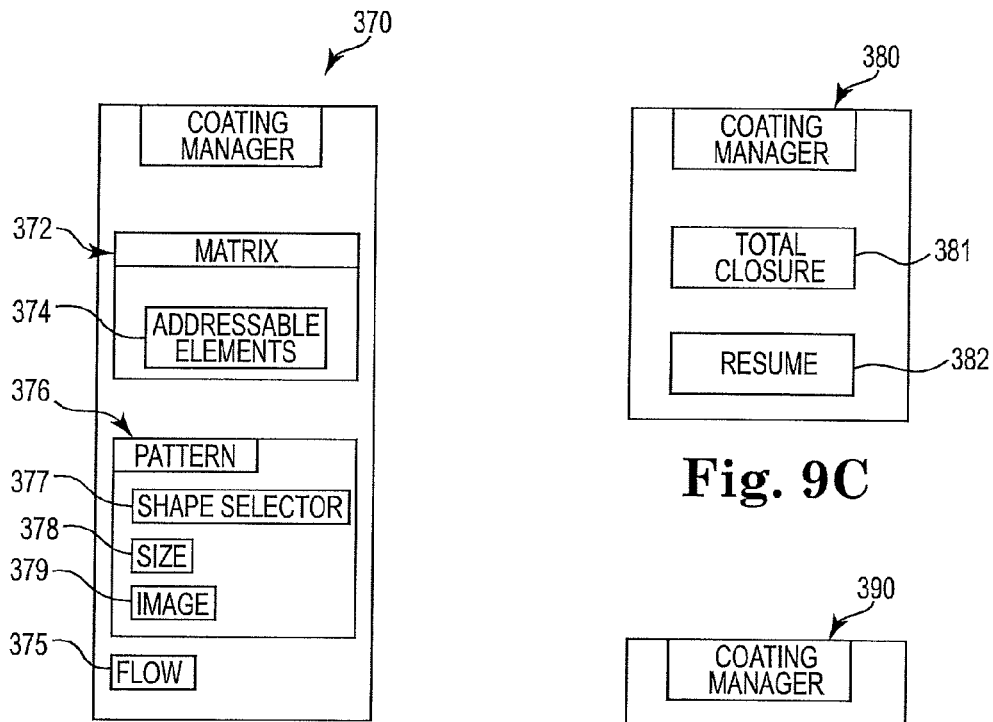
FIG. 9B is a block diagram schematically illustrating a coating manager, associated with a memory, according to one example of the present disclosure.

FIG. 9B is a block diagram schematically illustrating a coating manager 370, according to one example of the present disclosure, storable in memory 364. As shown in FIG. 9B, in one example, coating manager 370 comprises a matrix function 372, a pattern function 376, and a flow parameter 375. In a manner consistent with at least some examples of the present disclosure as previously described in association with FIGS. 1A-8C, in general terms the matrix function 372 defines a matrix of rows and columns of addressable elements 374 such that a surface area of an entire substrate can be mapped according to which addressable elements are to be coated or left uncoated. By selecting which addressable elements are to be coated and leaving other elements to remain uncoated, a particular coating pattern is achieved.

In one example, to provide at least some level of automation for a user, coating manager 370 includes a pattern function 376 by which a user can simply select a shape via shape selector function 377 and a size (via size function 378) of a coating pattern to be applied onto a substrate. Such shapes include, but are not limited to, circles, squares, triangles, zigzag patterns, etc. In some examples, the selectable coating pattern is sized to correspond to just a portion of a substrate such that other selectable coating patterns also can be formed on the substrate.

In one example, to form more complex coating patterns, pattern function 376 of coating manager 270 includes an image function 379 capable of receiving a digital image or digital graphic for which a corresponding coating pattern is to be formed on the substrate To do so, the coating manager 370 automatically converts the shapes and sizes in the digital image into a specified configuration of addressable coated elements that will re-produce the shapes and sizes of the digital image as a coating pattern on the substrate.

Figure 9C:
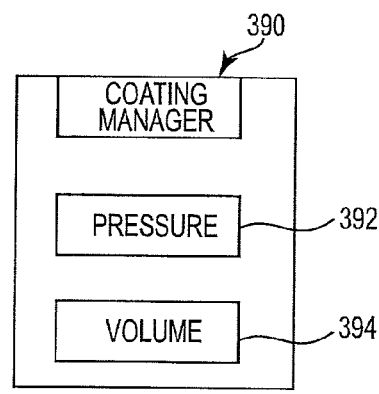
FIG. 9C is a block diagram schematically illustrating a coating manager, according to one example of the present disclosure.

FIG. 9C is a block diagram schematically illustrating a coating manager 380, according to one example of the present disclosure. In one example, coating manager 380 comprises a total closure function 381 and a resume function 382. In one aspect, operation of the total closure function 381 causes all slot portions of a coater assembly to be simultaneously closed for a period of time to achieve a non-coated band within a general coating pattern. In one example, this total closure of all the slot portions results in formation of at least one column (of the matrix of addressable elements 312) of uncoated elements on the substrate. In one example, the total closure function 381 produces a coating pattern of the type shown in FIG. 8C, in which the coating pattern includes an intermediate portion 351B that is uncoated and sandwiched between other coating pattern portions (e.g. first coating pattern portion 351A and second coating pattern portion 351C) of a single coating job.

In another aspect, operation of the resume function 382 follows operation of the total closure function 381 and causes at least some of the slot portions to permit renewed flow to form coated portions on the substrate according to a target pattern of coated and uncoated portions. In one example, the resume function 382 resumes selective coating according to a configuration that is not a continuation of coating segments that occurred prior to the total closure. In one example, via the resume function 382, at least some coatable portions of a second column are immediately adjacent the at least one column of uncoated portions resulting from operation of the total closure function 381.

In some examples, coating manager 380 further comprises at least substantially the same features as coating manager 370 (FIG. 9B), such that the total closure function 381 and/or resume function 382 form part of and/or operate in cooperation with matrix function 372, pattern function 376, and/or flow parameter 375, as previously described in association with FIG. 9B.

Figure 9D:
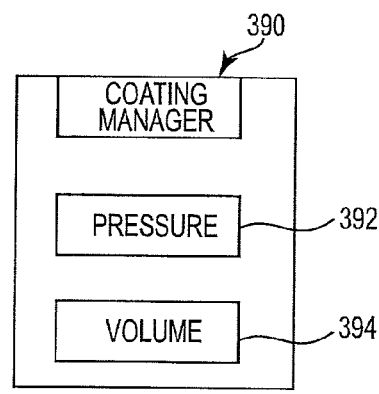
FIG. 9D is a block diagram schematically illustrating a coating manager, according to one example of the present disclosure.

FIG. 9D is block diagram schematically illustrating a coating manager 390, according to one example of the present disclosure. In one example, coating manager 390 comprises a pressure function 392 and a volume function 394. In general terms, coating manager 390 operates in cooperation with, and provides control over, pressure-volume regulator assembly 29 (FIG. 2B) to regulate the pressure of fluid within coater assembly (e.g. coater assembly 11) and/or the volume of fluid before, during, and/or after abrupt changes in the flow rate exiting the coater assembly. In one example, such abrupt changes would occur upon operation of the total closure function 381 and/or resume function 382 of coating manager 380 (FIG. 9C). In one aspect, upon a total closure of all slot portions from a flow state, some of the volume of the fluid in the coater assembly is automatically decreased to account for the sudden stoppage of flow to prevent overpressure. Alternatively, upon a total closure of all slot portions from a flow state, a pressure pump or regulator is adjusted to apply less pressure on the fluid within coater assembly. Of course, in some examples, the pressure function 392 and the volume function 394 both operate in a cooperative fashion to manage the pressure and/or volume of fluid within a coater assembly.

In one example, the pressure function 392 and volume function 394 are implemented via a pressure relief pathway such as a recirculation path from an area adjacent the slot portions to a main reservoir or such as a pressurization relief valve and reservoir to which some fluid can flow upon a total closure to relieve or prevent an overpressure condition.

In some examples, in addition to pressure and volume functions 392, 394, coating manager 390 comprises at least substantially the same features and attributes as coating manager 370 (FIG. 9B) and/or coating manager 380 (FIG. 9C).

Figure 10:
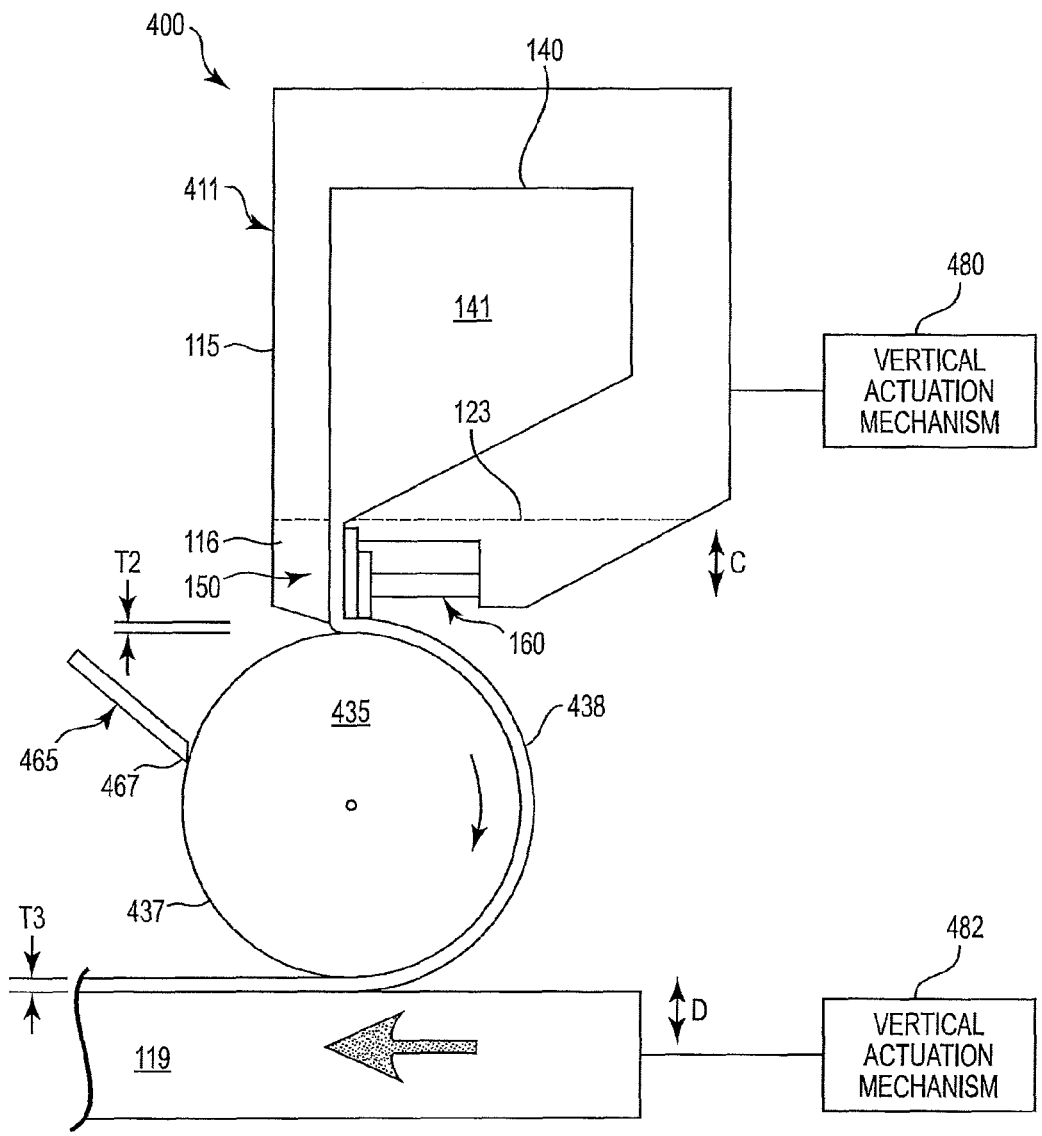
FIG. 10 is a side sectional view, similar to the view taken along lines 4A-4A of FIG. 1, schematically illustrating a coating assembly in coating relation to a substrate, according to one example of the present disclosure.

FIG. 10 is a side sectional view similar to the view of FIG. 4A and schematically illustrates a coating system 400, including coater assembly 411, according to one example of the present disclosure. In one example, the coating system 400 includes at least substantially the same features and attributes as coating systems as previously described in association with at least FIGS. 1-4B, except further including a transfer member 435 interposed between the coater assembly 411 and the substrate 119. In one example, as shown in FIG. 10, the transfer member 435 comprises a roller or disc shaped element having an outer surface 437 positioned to receive fluid 141 flowing out of slot portion(s) of coater assembly 411 in a coating pattern. Upon rotation of transfer member 435, the patterned coating material becomes deposited onto the substrate 119. In one aspect, the transfer member 435 is coupled in fixed relation to the coater assembly 411 such that transfer member 435 travels with the coater assembly 411 or remains in fixed position with coater assembly 411.

In some examples, the coater assembly 411 includes a first position actuation mechanism 480 to adjust a position of coater assembly 411 relative to the transfer member 437 (as represented by directional arrow C) and includes a second position actuation mechanism 482 to adjust a position of the substrate 119 (or substrate support underlying the substrate) relative to the transfer member 437 (as represented by directional arrow D).

In some examples, the outer surface 437 of transfer member 435 includes a resilient compliant member to facilitate good contact during releasable engagement of the transfer member 437 against substrate 119 and/or in coating relation to the slot portion(s) of coater assembly 411.

In some examples, coating system 400 includes a blade 465 (with a tip 467) positioned to scrape excess coating fluid off outer surface 437 of transfer member 435 after patterned coating material 438 has been transferred from the transfer member 435 to the substrate 119.

Figure 11:
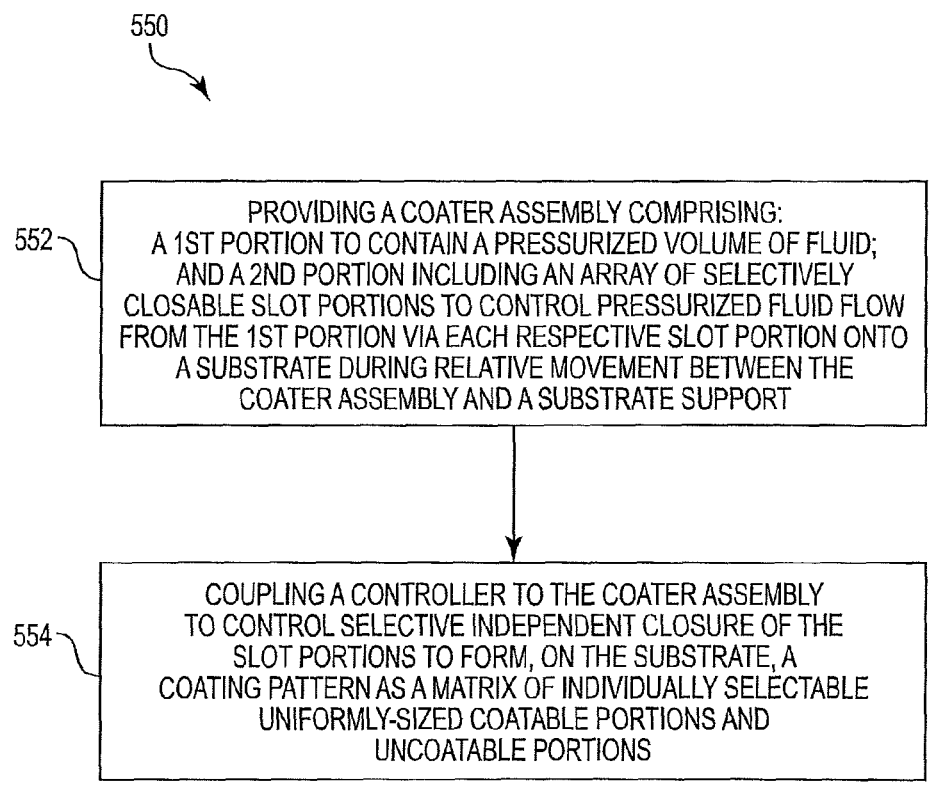
FIG. 11 is a flow diagram schematically illustrating a method of manufacturing a coating system, according to one example of the present disclosure.

FIG. 11 is a flow diagram schematically illustrating a method 550 of manufacturing, according to one example of the present disclosure. In some examples, method 550 is performed using at least substantially the same systems, assemblies, components, modules, and/or elements as previously described in association with FIGS. 1-10. In some examples, method 550 is performed using systems, assemblies, components, modules, and/or elements other than those previously described in association with FIGS. 1-10.

As shown in FIG. 11, in one example at 552, method 550 includes providing a coater assembly comprising a first portion to contain a pressurized volume of fluid and a second portion including an array of selectably closable slot portions. Via the respective slot portions, the second portion provides control over pressurized fluid flow from the first portion onto a substrate during relative movement between the coater assembly and the substrate. At 554, method 550 includes coupling a controller to the coater assembly to control selective independent closure of the slot portions to form, on the substrate, a coating pattern via a mapping matrix of individually addressable uniformly-sized coatable elements.

Although specific examples have been illustrated and described herein, it will be appreciated by those of ordinary skill in the art that a variety of alternate and/or equivalent implementations may be substituted for the specific examples shown and described without departing from the scope of the present disclosure. This application is intended to cover any adaptations or variations of the specific examples discussed herein.

The invention claimed is:

1. A coating system comprising:
  a slot coater assembly including:
    a first portion to contain a pressurized volume of a fluid; and
    a second portion including a linear array of side-by-side, selectively openable and closable slot portions to control a pressurized fluid flow from the first portion via each respective slot portion onto a substrate during a relative movement between the slot coater assembly and the substrate, the linear array extending in a first orientation transverse to a substrate advance direction, wherein the linear array of slot portions has a width extending in the first orientation and which is at least equal to a width of the substrate, wherein each respective slot portion has a width less than the width of the linear array, wherein the linear array of slot portions are defined by, and between, a first surface portion which is rigid and a second surface portion which is flexible and parallel to the first surface portion, and wherein the respective first and second surface portions have a width extending in the first orientation; and
  a control module including a processor and a non-transitory memory storing machine readable instructions, executable by the processor, to control selective independent opening and closure of the slot portions to form on the substrate, independent of a coating pattern template, a coating pattern via a mapping matrix of individually addressable uniformly-sized coatable elements, wherein each respective coatable element has a width equal to the width of a respective one of the slot portions and has a length selectable by a predefined time duration,
  wherein the coating pattern comprises coated portions and non-coated portions, with each coated portion being formed according to at least one coatable element by opening at least one slot portion and each non-coated portion being formed according to at least one coatable element by closing at least one slot portion,
  wherein at least one coating pattern of a plurality of different coating patterns is formable on the substrate according to the mapping matrix of coatable elements via the machine readable instructions per operation of the control module to selectively close and open the slot portions, the at least one coating pattern comprising at least one non-coated portion bordered on all sides by coated portions within the coating pattern.

2. The coating system of claim 1, wherein the stored machine readable instructions are to implement:
  a total closure mode implementable at least along an intermediate portion of the substrate, in the substrate advance direction, in which all of the slot portions are simultaneously closed to cause at least one first column of the mapping matrix of coatable elements to be designated as non-coated portions; and
  a resume mode to resume selective fluid flow through at least one of the respective slot portions, after completion of the total closure mode, to form at least one coated portion according to at least one coatable element of a second column immediately adjacent the at least one first column of non-coated portions resulting from the total closure mode,
  wherein the at least one first column and the second column extend in the first orientation transverse to the substrate advance direction.

3. The coating system of claim 2, comprising:
  a pressure-and-volume control module to control the pressure and volume of the fluid during operation of the full closure mode and resume mode.

4. The coating system of claim 1, wherein each slot portion has a width extending along the first orientation sized to produce coated portions and non-coated portions, via the mapping matrix of selectable coatable elements, having a width of one millimeter.

5. The coating system of claim 4, wherein the control module provides timing control to produce coated portions and non-coated portions, via the mapping matrix of selectable coatable elements, having a length of one millimeter.

6. The coating system of claim 1, wherein the array of slot portions comprise:
  an array of actuators with each actuator directly corresponding to a respective one of the selectively closable slot portions, wherein each actuator includes an arm, perpendicular to and connected to the second surface portion, each arm individually controllable between:
    a retracted position to move a corresponding segment of the second surface portion into a first open position spaced apart from the first surface portion to allow the fluid to flow onto the substrate; and an extended position to move the corresponding of the second surface portion into a second closed position in releasable sealing contact against the first surface portion to prevent the fluid from flowing onto the substrate.

7. The coating system of claim 6, wherein at least some of the actuators comprise a stack piezoelectric actuator that moves in a second orientation perpendicular to the first orientation.

8. The coating system of claim 1, wherein the slot coater assembly comprises:
 a transfer member interposed between the coater assembly and the substrate.

9. A coating system comprising:
 a slot coater assembly including:
  a first portion to contain a pressurized volume of a fluid; and
  a second portion including a linear array of side-by-side, selectively openable and closable slot portions to control a pressurized fluid flow from the first portion via each respective slot portion onto a substrate during a relative movement between the coater assembly and the substrate, the linear array extending in a first orientation transverse to a substrate advance direction, wherein the linear array of slot portions has a width extending in the first orientation and which is at least equal to a width of the substrate, wherein each respective slot portion has a width less than the width of the linear array, wherein the linear array of slot portions are defined by, and between, a first surface portion which is rigid and a second surface portion which is flexible and parallel to the first surface portion, and wherein the respective first and second surface portions have a width extending in the first orientation; and
 a control module including a processor and a non-transitory memory storing machine readable instructions, executable by the processor, to:
  control selective independent opening and closure of the slot portions to form on the substrate, without a physical template, a coating pattern of coated portions and non-coated portions via a mapping matrix of individually addressable uniformly-sized coatable elements, according to at least:
   a total closure mode implementable at least along an intermediate portion of the substrate, in the substrate advance direction, in which all of the slot portions are simultaneously closed to cause at least one column of the mapping matrix of coatable elements to be designated as non-coated portions; and
   a resume mode implementable in which at least one of the respective slot portions are opened, after completion of the total closure mode, to cause selective fluid flow to form coated portions within the at least one single image according to at least one coatable element of a second column immediately adjacent the at least one column of non-coated portions resulting from the total closure mode,
  wherein each respective coatable element has a width equal to the width of a respective one of the slot portions and has a length selectable by a predefined time duration,
  with each coated portion being formed according to at least one coatable element by opening at least one slot portion and with each non-coated portion being formed according to at least one coatable element by closing at least one slot portion,
  wherein at least one coating pattern of a plurality of different coating patterns is formable on the substrate according to the mapping matrix of coatable elements via the machine readable instructions per operation of the control module to selectively close and open the slot portions, the at least one coating pattern comprising at least one non-coated portion bordered on all sides by coated portions within the coating pattern.

10. The coating system of claim 9, comprising:
 a pressure-and-volume control module to control the pressure and volume of the fluid during operation of the full closure mode and resume mode.

11. A coating system comprising:
 a slot coater assembly including:
  a first portion to contain a pressurized volume of a fluid; and
  a second portion including a linear array of side-by-side slot portions to control pressurized fluid flow from the first portion via each respective slot portion onto a substrate during relative movement between the slot coated assembly and the substrate, the linear array extending in a first orientation transverse to a substrate advance direction,
 wherein the linear array of slot portions has a width extending in the first orientation and which is at least equal to a width of the substrate, and wherein each slot portion of the linear array has a width which is less than the width of the linear array, and
 wherein each respective slot portion is defined by, and between, a first surface portion which is rigid and a second surface portion which is resilient and flexible, and that is parallel to the first surface portion, wherein the respective rigid first surface portion and flexible second surface portion extend in the first orientation, and
 wherein each respective slot portion comprises an actuator aim connected to the second surface portion and movable between:
  an extended position to releasably seal the second surface portion against the first surface portion corresponding to a closed position of a respective one of the slot portions; and
  a retracted position to position the second surface portion to be spaced apart from the first surface portion corresponding to an open position of a respective one of the slot portions; and
 a control module including a processor and a non-transitory memory storing machine readable instructions, executable by the processor, to control selective independent opening and closure of the slot portions, via movement of the respective actuator arms between the retracted and extended positions, to form on the substrate a coating pattern including coated portions and non-coated portions, via a mapping matrix of individually addressable uniformly-sized coatable elements, including formation of the coating pattern without reference to a template on the substrate, wherein each respective coatable element has a width equal to the width of a respective one of the slot portions and has a length selectable by a predefined time duration,
 with each coated portion being formed according to at least one coatable element by opening at least one slot portion and with each non-coated portion being formed according to at least one coatable element by closing at least one slot portion, wherein at least one coating pattern of a plurality of different coating patterns is formable on the substrate according to the mapping matrix of coatable elements via the machine readable instructions per operation of the control module to selectively close and open the slot portions, the at least one coating pattern comprising at least one non-coated portion bordered on all sides by coated portions within the coating pattern.

12. The coating system of claim 1, wherein at least one of the non-coated portions of the coating pattern are subsequent to, and aligned parallel to a longitudinal axis of the substrate advance direction relative to, at least one of the coated portions of the coating pattern.

13. The system of claim 1, wherein the coating pattern template comprises a patterned coating blanket.

14. The system of claim 1, wherein the respective first and second surface portions are adjacent the substrate.

* * * * *